United States Patent [19]
Compton et al.

[11] 3,734,256
[45] May 22, 1973

[54] TORQUE TRANSMITTING DEVICE

[75] Inventors: William H. Compton; John B. Desch, both of Brecksville, Ohio

[73] Assignee: Comptrol Incorporated, Cleveland, Ohio

[22] Filed: Dec. 6, 1971

[21] Appl. No.: 204,884

[52] U.S. Cl. ......... 192/84 A, 192/107 R, 192/107 M, 192/113 A, 192/111 R, 188/161, 188/71.6, 188/73.2, 188/218 XL
[51] Int. Cl. ............................................. F16d 27/07
[58] Field of Search ........................ 192/84 A, 107 R, 192/107 M, 113 A, 111 R, 70.14; 188/71.6, 73.2, 161, 163, 264 A, 218 XL

[56] References Cited
UNITED STATES PATENTS

| | | |
|---|---|---|
| 3,167,673 | 1/1965 | Miquel et al. ............... 188/161 X |
| 1,734,598 | 11/1929 | Schramm .................... 192/107 R |
| 2,082,969 | 6/1937 | Myers ........................ 192/107 R |
| 3,171,527 | 3/1965 | Ott ............................ 192/107 R X |
| 3,237,737 | 3/1966 | Mamo ........................ 192/111 R X |
| 3,330,391 | 7/1967 | Mamo ........................ 192/70.14 UX |
| 3,451,516 | 6/1969 | Watson ....................... 192/107 X |

*Primary Examiner*—Allan D. Herrmann
*Attorney*—John F. Luhrs

[57] ABSTRACT

A magnetic friction device for transmitting torque from one to the other of spaced apart, relatively rotatable, axially aligned members. One of the members carries a circular band of friction material concentric with the axis of rotation of the member. Cooperating therewith, carried by the other member, are a plurality of axially movable segments or planets, each having a flat face adapted to engage the face of the circular band of friction material. Additionally, the planets may be rotatably journaled in said other member and so disposed relative to the band of friction material that engagement therewith and relative rotation of the members causes each planet to rotate about its axis. Each planet is axially moved into engagement with the band of friction material by a controlable magnetic force applied to all of the planets to thereby transmit torque from one member to the other.

13 Claims, 13 Drawing Figures

Patented May 22, 1973

INVENTORS
WILLIAM H. COMPTON
JOHN B. DESCH

BY John X. Luhrs

Patented May 22, 1973

INVENTORS
WILLIAM H. COMPTON
JOHN B. DESCH

BY

John X. Lukes

TORQUE TRANSMITTING DEVICE

This invention relates to magnetic friction devices for transmitting torque from one to the other of axially aligned relatively rotatable members. Devices of this type are used in a wide variety of applications such as, for example, clutches, slip clutches, stopping brakes, holding brakes, and brakes used for retarding motion as in systems requiring tension in paid-off materials.

Typically, transmitting devices of the type with which the present invention is concerned comprise a pair of axially aligned, spaced apart, relatively rotatable plates or discs. One of the plates carries an axially aligned circular U-shaped electromagnet housing a band of friction material. The other plate comprises the armature for the magnet and is adapted to be drawn into axial gripping engagement with the band of friction material upon energization of the electromagnet. A major disadvantage of such prior art devices is that the area of contact between the armature and band of friction material is subject to change because of axial or radial misalignment of the plates and variations in the contour of the surface of friction material. Accordingly, such devices have been limited in their application and have not, for example, been successfully applied as constant torque transmitting devices, wherein it is necessary that a constant and repeatable torque be transmitted from one member to the other for a given energization of the electromagnet.

In accordance with our invention the said other plate does not comprise the armature for the magnet, nor is it brought into gripping engagement with the band of friction material. It essentially acts as a carrier for a plurality of axially movable segments, or planets, as they are sometimes hereafter called, mounted in circular arrangement, which are brought into gripping engagement with the band of friction material. By thus breaking the armature into a plurality of discreet segments, each free to axially move, a substantially constant area of contact is maintained between the armature and band of friction material regardless of axial or radial misalignment of the members, variations in the surface contour of the band of friction material, or other imperfections in the device. Furthermore, as each segment is self aligning with the surface contour of the band of friction material, the gripping force on one segment produced by a given energization of the electromagnet is the same as the gripping force on each of the other segments.

Further, in accordance with our invention, each segment or planet may be in the form of a disc having an axle journaled in said other plate so that each is free to rotate about its axis as well as being free to axially move. Rotation of each planet upon engagement with the band of friction material may be induced by any one of several means as hereinafter described in detail. The rotation of the planets about their respective axes, while being carried in circular orbit as one member rotates relative to the other, produces a cleaning action of the planet and surfaces of the band of friction material, as well as promoting uniform wear without galling or gripping.

With the foregoing in mind, it is a major object of this invention to provide a novel electromagnetic friction device for transmitting a repeatable and constant torque from one rotatable member to another for a given energization of the electromagnet.

Still another object is to provide such a device wherein a maximum and constant area of contact is maintained between the friction elements.

A further object is to provide such a device incorporating a self cleaning action of the frictional elements.

Another object is to provide such a device promoting uniform wear without galling or grooving of the frictional elements.

Further objects of this invention will appear as the description proceeds in connection with the appended claims and the drawings, in which;

Figure 10:
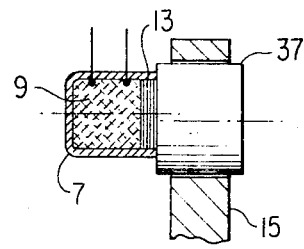
Figure 12:
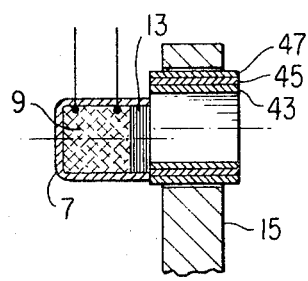
Figure 11:
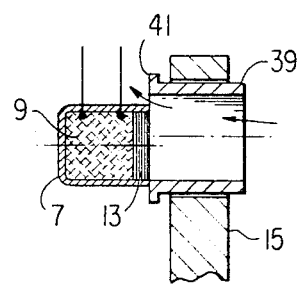

FIGS. 10, 11, and 12 are fragmentary views illustrating modified forms of armature planets.

DETAILED DESRIPTION

Figure 1:
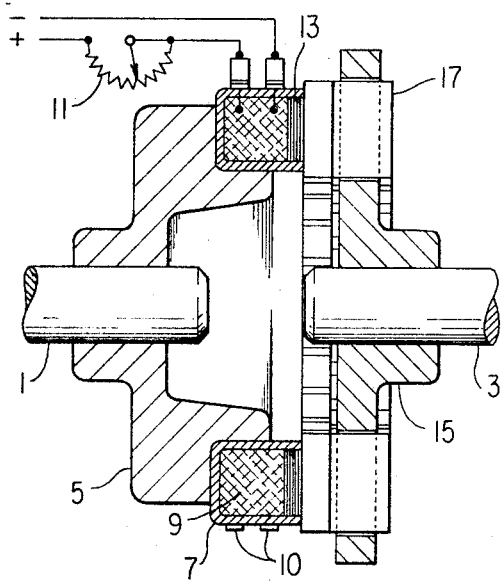
FIG. 1 is a side elevation view, in cross section, of one embodiment of our invention.
Figure 2:
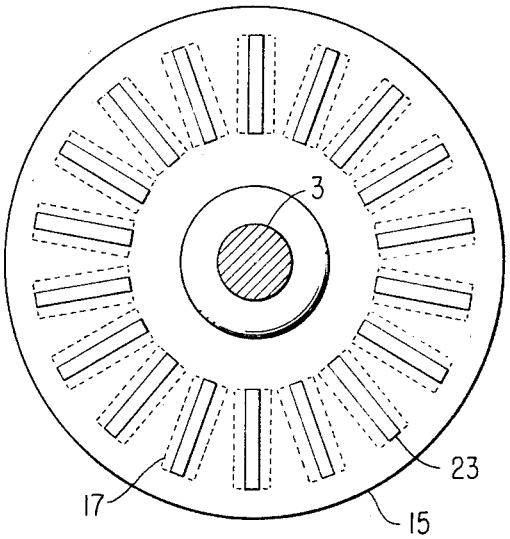
FIG. 2 is an end elevation view of the embodiment of our invention shown in FIG. 1.

FIGS. 1 and 2 illustrate an embodiment of our invention for transmitting torque between a shaft 1 and a shaft 3, either one of which may be stationary and the other rotatable as would be the case where the device is used as a brake of one form or another; or both may be rotatable as would be the case where the device is used as a clutch of one form or another. Secured to the shaft 1 is a member or housing 5 carrying a circular U-shaped electromagnet 7 having a field winding 9 energized by a source of direct current. Energization of the field winding 9 may be controlled by any suitable means such as the rheostat 11. If the shaft 1 is rotatable, connection to the source of direct current may be made through any conventional means such as sliprings 10. Disposed within the legs of the electromagnet 7 is a circular band of friction material 13 having an outer face substantially flush with the outer ends of the electromagnet 7.

Figure 1A:
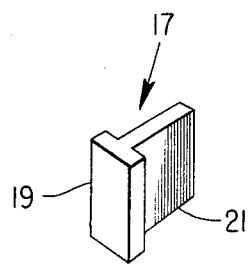
FIG. 1A is a perspective view of one of the armature segments or planets used in the embodiment of the invention shown in FIG. 1.

Secured to the shaft 3 is a circular member or plate 15 forming a carrier for a plurality of armature segments or planets 17. As shown in FIG. 1A each planet is provided with a flat face 19, which may be rectangular or of other desired configuration, and a rearward extending rectangular section 21. The plate 15 is provided with slots such as shown at 23 in which are loosely journaled the rectangular sections 21 of the planets. Each planet is therfore free to move as required to establish and maintain compliance with the friction surface of the band 13 upon energization of the electromagnet 7. As evident, the gripping action between the planet 17 and the band of friction material will be a function of the energization of the elctromagnet 7, readily adjustable by means of the rheostat 11. Thus our device, as previously mentioned, finds application as a brake wherein one or the other of the shafts 1 and 3 is held stationary and the other is rotatable by a torque being applied thereto; or as a clutch wherein both shafts 1 and 3 are rotatable, one being the input shaft driven from a suitable power source and the other the output shaft. With either application the torque transmitted between the shafts is a constant and repeatable function of the energization of the electromagnet, thus making our device particularly suitable for the applications requiring a precise and predetermined torque transmittal for a given energization of the electromagnet.

Figure 3:
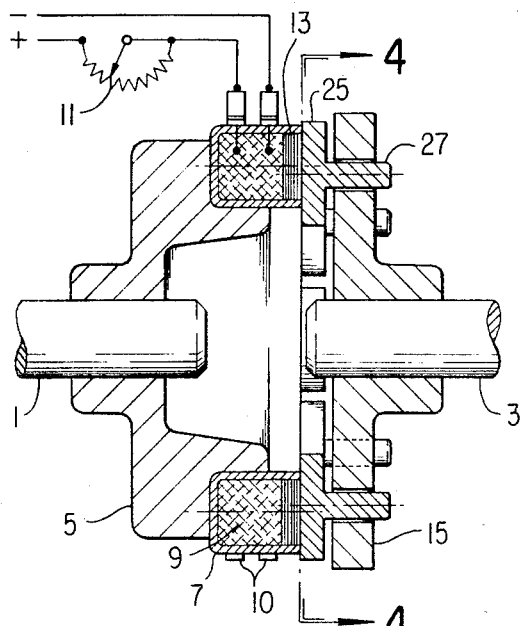
FIG. 3 is an elevation view, partially in cross section, of another embodiment of the invention.
Figure 4:
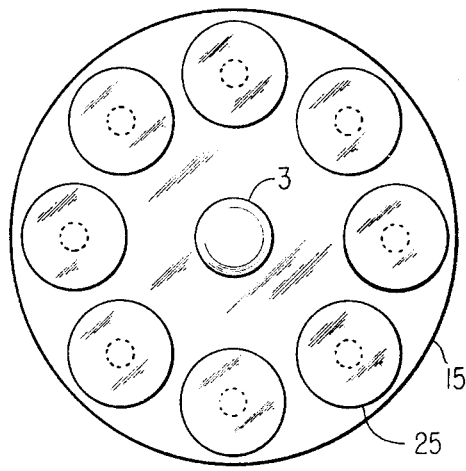
FIG. 4 is a sectional view taken along the lines 4—4 of FIG. 3 in the direction of the arrows.

FIGS. 3 and 4 illustrate a modified form of armature which consists of a plurality of disc shaped planets 25 each having a rearward extending axle 27 journaled in the member 15. With this arrangement each planet is free to move axially into engagement with the band of friction material and to rotate about its axis while carried in circular orbit upon relative rotation between the members 5 and 15. A particular feature of our invention is the unique arrangements provided for inducing rotation of the planets about their respective axes whereby, as heretofor explained, a cleaning action of the mating frictional surfaces is obtained and uniform wear is promoted without galling or grooving.

Figure 5:
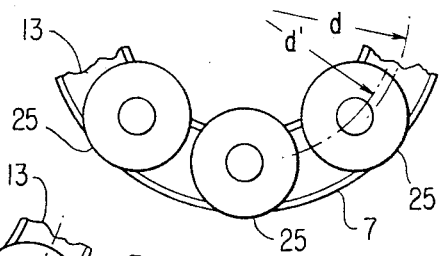
FIG. 5 is a fragmentary view of the arrangement in FIG. 3 of the armature planets and band of friction material.

In one arrangement, as shown in FIG. 3 and in the fragmentary view of FIG. 5, the centers of the planets are disposed on the circumferences of a circle of less diameter than the mean diameter of the band of friction material. Upon engagement of the friction surfaces and relative rotation of the members 5 and 15 a greater torque is therefor developed on the outer portion of the faces of the planets than the inner, resulting in rotation of each planet about its axis.

As used herein the term "mean diameter" is defined as that diameter of the band of friction material which, if the axis of rotation of a planet was on an intersecting perpendicular line, no rotation of the planet would result, as equal and canceling torques would be developed on the outer and inner portions of the planet face. The mean diameter, as defined herein, may be the same as or different from the mathmatical diameter of the center of the band of friction material. In any event, in the embodiment shown in FIGS. 3 and 4, our invention comprehends displacing the axis of rotation of the planets from the mean diameter of the band of friction material as may be required to induce rotation of the planets about their respective axes upon engagement with the band of friction material 13 and relative rotation between the members 5 and 15. In FIG. 5 the mean diameter of the band of friction material is identified as $d$, and the diameter of the circle on the circumference of which the axes of rotation of the planets lie is identified as $d'$. The diameter $d'$ is shown as being less than the diameter $d$ to induce rotation of the planets upon engagement with the band of friction material and being carried in circular orbit by relative rotation of members 5 and 15.

Figure 7:
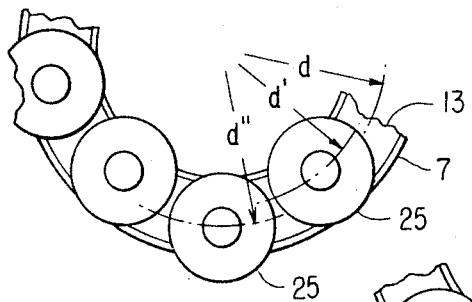
FIGS. 6 and 7 are fragmentary views illustrating alternate arrangements of the armature planets and band of friction material.
Figure 6:
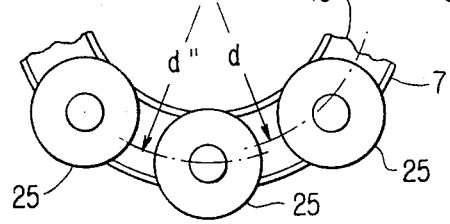

FIG. 6 illustrates an alternate arrangement wherein the centers of the planets are placed on the circumference of a circle of diameter $d''$ greater than the mean diameter $d$ of the band of friction material thus inducing rotation of the planets in opposite direction. FIG. 7 illustrates an arrangement producing rotation of some of the planets in one direction and of other planets in opposite direction. In the specific arrangement shown the centers of adjacent planets are on the circumference of circles having diameters $d'$ and $d''$. Thus adjacent planets will rotate in opposite directions.

From the foregoing it is apparent that our invention includes any configuration of rotatable planets having their axes of rotation on the circumference of a circle having a diameter greater than, or less than, or the same as the mean diameter of the band of friction material. In the last named configuration the planets would not normally rotate; but are free to momentarily do so upon engaging an imperfection in the surface of the band of friction material. The scouring action resulting from such rotation promoting the elimination of such imperfection and bringing the entire surface contour of the band of friction material into a uniform plane.

Figure 8:
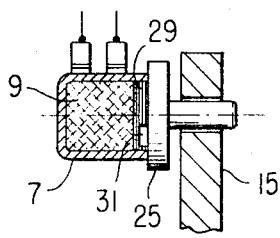
FIGS. 8 and 9 illustrate modified forms of the band of friction material which will induce rotation of the armature planets.
Figure 9:
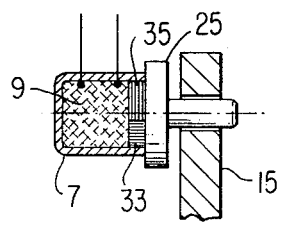

Our invention further comprehends other means for inducing rotation of the planets. Thus in FIG. 8 we show a band of friction material 29 having an annular relief 31 so that rotation of the planets will result not withstanding that the centers of the planets are on the circumference of a circle of the same diameter as the mean diameter of the band of friction material. It is evident that rotation of the planets could be induced in opposite direction from the direction induced by the arrangement shown in FIG. 8 by relieving the band of friction material adjacent to the outer leg of the electromagnet 7. Another arrangement, shown in FIG. 9 for inducing rotation of the planets consists of a band of friction material comprised of an inner section 33 having a coefficient of friction different from that of the outer section 35.

In FIG. 10, 11, and 12 we show modified forms of planets which may be substituted for those shown in FIG. 3 to adapt our device to the exigencies of a particular application. In FIG. 10 we show a planet consisting of a solid cylinder 37, journaled in member 15, free to move axially and rotate about its center. In FIG. 11 we show a planet consisting of a hollow cylinder 39 journaled in the member 15 and having a flange 41 the flat face of which is adapted to engage the band of friction material 13. With this form of planet, cooling air (as shown by the arrow) may be introduced into the interior thereof to dissipate the heat which may be generated while the planets are in engagement with the band of friction material and the member 5 rotates relative to the member 15. In FIG. 12 the planet is shown as comprised of a plurality of concentric sleeves 43, 45, and 47. The sleeves are axially movable relative to each other and the outer one 47 is journaled in the member 15. It is apparent that rotation of the modified form of planets shown in FIGS. 10, 11, and 12 may be induced by any one of the means previously discussed.

We claim:

1. A torque transmitting device comprising two spaced apart, axially aligned, relatively movable members, a circular band of frictional material carried by one of said members concentric with the axis of rotation, an axially movable planet comprising a disc having a flat face adapted to engage said band journaled in said other member having an axis of rotation radially displaced from the mean diameter of said band to cause said planet to rotate upon frictional engagement with said band, and means for axially moving said planet to bring said flat face into engagement with said band.

2. A torque transmitting device as set forth in claim 1 including a plurality of axial movable planets journaled in said other member and each having a flat face adapted to engage said band.

3. A torque transmitting device as set forth in claim 2 wherein the radius of the flat face of each of said planets is at least equal to one half of the width of said band plus the radial displacement of the axis of rotation of the planet from the mean diameter of said band.

4. A torque transmitting device as set forth in claim 2 wherein the axes of rotation of some of the planets are radially displaced from the mean diameter of said band in one direction and the remainder of the planets are radially displaced from the mean diameter of said band in the opposite direction.

5. A torque transmitting device as set forth in claim 1 wherein the means for axially moving said planet into engagement with said band comprises a magnet.

6. A torque transmitting device as set forth in claim 5 wherein said magnet is an electromagnet.

7. A torque transmitting device as set forth in claim 6 further including means for adjusting the current in said electromagnet.

8. A torque transmitting device as set forth in claim 7 wherein said electromagnet is U-shaped and concentrically mounted on said one member with the axis of rotation thereof and said circular band of friction material is mounted within said magnet and the face of said band engaging said planet is substantially flush with the end edges of said U-shaped magnet.

9. A torque transmitting device as set forth in claim 8 wherein said planet comprises the armature for said electromagnet.

10. A torque transmitting device as set forth in claim 9 wherein said band has a width less than the width of said U-shaped magnet.

11. A torque transmitting device as set forth in claim 8 wherein the field of said U-shaped magnet comprises an annular coil mounted within said U-shaped magnet.

12. A torque transmitting device comprising two spaced apart, axially aligned, relatively rotatable members, a circular band of frictional material carried by one of said members concentric with the axis of rotation of said members, and axially movable planet comprising a plurality of hollow concentric cylindrical sleeves each having a flat annular end face adapted to frictionally engage said band and each free to move axially and independently rotate, the outer one of said sleeves journaled in said other member, and means for axially moving said planet to bring the flat end faces of said sleeves into engagement with said bands.

13. A torque transmitting device comprising two spaced apart, axially aligned, relatively rotatable members, a circular band of frictional material composed of a plurality of circular sections, one of said sections having a coefficient of friction greater than the coefficient of friction of another of said sections, an axially movable planet journaled in the other of said members having a flat face adapted to engage said band, and means for axially moving said planet to bring said flat face into engagement with said band.

* * * * *